April 22, 1930.　　　V. H. HARBERT　　　1,755,394
PIPE ANCHORING MEANS
Filed Feb. 24, 1928
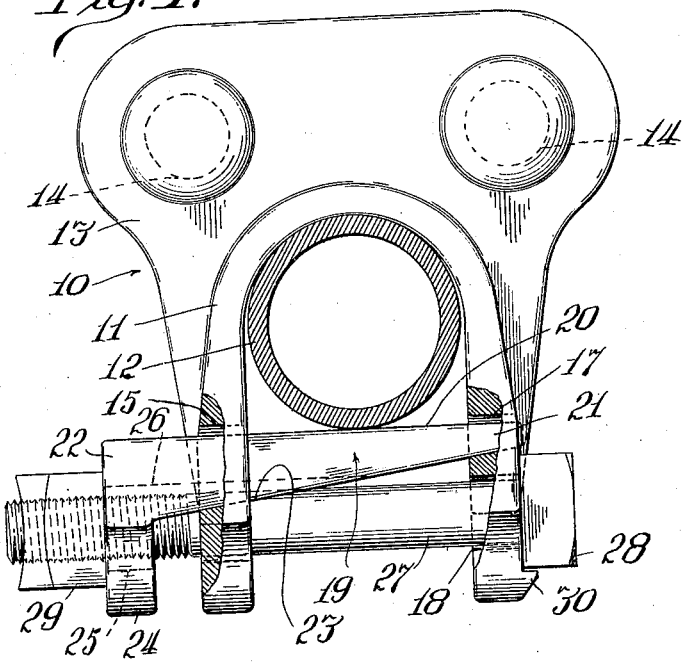
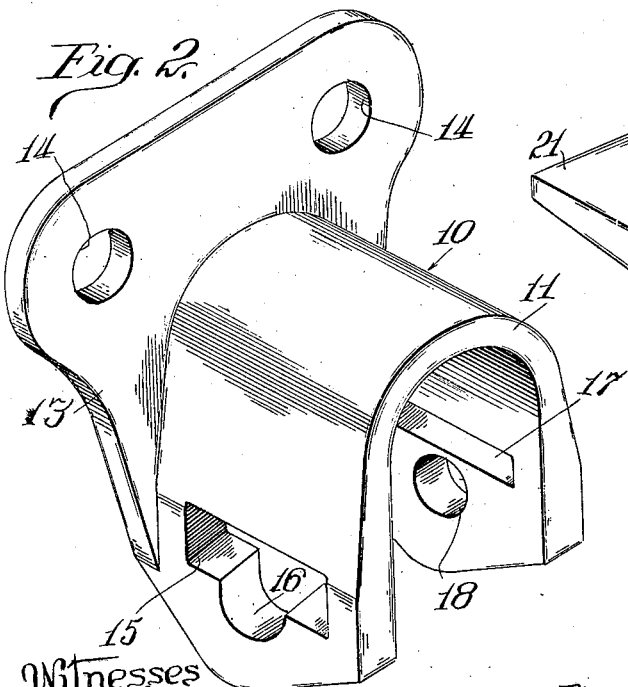
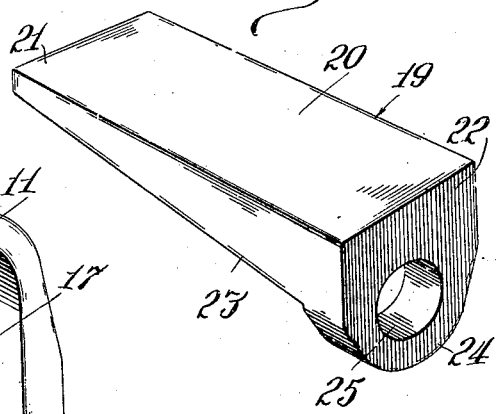
Inventor
Victor H. Harbert,
By George Heideman
Attorney Patented Apr. 22, 1930

1,755,394

UNITED STATES PATENT OFFICE

VICTOR H. HARBERT, OF CHICAGO, ILLINOIS

PIPE-ANCHORING MEANS

Application filed February 24, 1928. Serial No. 256,514.

My invention is more especially intended for supporting and clamping the air pipes of the air brake system of a railroad car in place. My improved means is more particularly adapted for securing the horizontally disposed pipe to the underframe of the car so as to firmly hold the pipe or line against displacement and therefore to retain the same in place and avoid vibration and prevent a rupture of the pipe connections which would result in leaky air lines and therefore interfere with proper operation of the air brake system.

My invention contemplates means which may be easily applied to air pipes or lines in service without necessitating a dismantling or disconnection of the air line; while at the same time permitting ready renewal of the air pipe or line to be made if occasion should arise. The embodiment of my invention is of such a nature that a renewal of the air pipe or line may be made without necessitating a dismantling of the anchoring means beyond a removal of the wedging element which constitutes a part of my improved means.

The invention contemplates means of such a nature that no special skill or tools are necessary in its installation and application; said means at the same time being of a strong, durable and comparative light construction and yet simple in manufacture. The objects and advantages of my invention will be readily comprehended from the detailed description of the drawing, wherein—

Figure 1 illustrates my improved means in elevation and assembled relation, showing its application to an air pipe which is shown in section.

Figure 2 is a perspective view of the main element of my improved means.

Figure 3 is a perspective view of the wedge element of my improved means.

The particular exemplification of the invention, as disclosed in the drawing, is intended for application to some suitable transverse member or portion of the car underframe for supporting and anchoring in place the air pipe or lines disposed longitudinally beneath the car and therefore involves the main member 10 comprising an inverted U-shape body portion 11, having walls of suitable thickness and of comparative width to provide a wide bearing or seat for the pipe shown at 12 in Figure 1. The U-shape body portion 11 is of vertical dimensions greater than the diameter of the pipe which is to be seated therein; with the curved portion at the top of the body portion adapted to receive the pipe 12.

One end of the body portion 11 is shown provided wih an integral flange portion 13 preferably disposed upwardly and above the closed top of the body portion. This flange 13 is preferably shown enlarged at its upper end and provided with a pair of bolt or rivet-receiving apertures 14 which enables the means to be securely fastened at a suitable point on the car underframe so as to permit the body portion to straddle the pipe 12, as shown in Figure 1.

One side or leg of the yoke or U-shape portion 11, adjacent to the lower end thereof, is provided with a transverse slot 15, the intermediate lower side whereof is shown semi-circular at 16.

The opposite side or leg of the yoke or inverted U-shape portion 11 is also provided with a transverse slot 17 arranged substantially in horizontal alignment with the upper portion of the slot 15; the slot 17, however, being of less vertical dimension than slot 15. The same side or leg of portion 11 in which slot 17 is located is shown provided with an aperture or preferably circular hole 18 arranged beneath slots 17; the lower half of hole 18 being preferably arranged in horizontal alignment with the semi-circular portion 16 of slot 15 in the opposite side or leg.

The slots 15 and 17 are intended to receive a wedge member 19 shown in perspective in Figure 3. This wedge member consists of a rigid metallic bar of width approximating the width of slots 15 and 17 and preferably provided with a flat upper face 20 which is adapted to be disposed toward the adjacent side of the air line or pipe 12; while the lower or opposite side of member 19 is tapered. That is to say, the member 19 increases in vertical dimensions or thickness from the end 21 toward the opposite end 22, as shown at 23 in Figure 3, and the end 22 terminates in a depending ear or lobe 24 provided with a bolt-receiving aperture 25. The lower face of member 19, at the longitudinal center line thereof, is preferably slightly channeled from the end 22 to a point substantially midway of the ends of the member, as indicated in dotted lines at 26 in Figure 1, in order to provide clearance and a proper seat for the wedge-holding bolt 27. The taper of member 19 is such as to permit said member 19 to be inserted through slot 15 in member 10 and into slot 17 in the opposite side or leg of member 10; the thickness of member 19 gradually increasing toward end 22 thereof to an extent somewhat less than the vertical dimension of slot 15 in order that key or wedge member 19 will be forced into firm wedging relation with the pipe 12 before the lobe or depending ear 24 of the wedge member contacts with the side of member 10 having slot 15.

My improved means is applied by having the inverted U-shape portion 11 of member 10 disposed across or in straddling relation with the pipe 12 as shown in Figure 1, after which the reduced end of wedge member 19 is inserted through slot 15 and thence into slot 17. A suitable holding element or bolt 27 is then put into place through hole 18, with the head 28 of the bolt preferably in abutting relation with the side of the yoke or inverted U-shape portion 11 having slot 17, while the shank of the bolt extends through the semicircular portion 16 of slot 15 in the opposite side or leg of the inverted U-shape portion 11 and through the aperture 25 of the depending lobe or ear 24 of the key or wedge member 19; the bolt extending longitudinally in the lower channeled side of the wedge member as previously stated. The threaded end of the bolt which is disposed through aperture 25 of the lobe or ear 24 of wedge member 19 is then provided with a suitable nut as at 29 which is firmly screwed onto the bolt, thereby causing the key or wedge member 19 to move lengthwise of the bolt, namely transversely of the body member 10 and the air line or pipe 12 which is to be anchored thereby. The slots 15 and 17 are arranged so that the upper sides of the slots will be disposed in a plane above that of the lower or wedge contacting side of the pipe to be anchored in place, to permit the member 19 to effect wedging relation with the pipe without contacting with the upper sides of slots 15 and 17, see Figure 1. It is apparent that when the nut on the bolt is screwed thereon, the lower tapered surface of wedge member 19 will be caused to ride upwardly in the slots of the body portion and as a result increase its clamping or anchoring relation with the air pipe; the wide upper bearing face 20 of the wedge member, however, preventing any damage to or cutting of the air pipe while ensuring a wide and firm bearing on the pipe which will prevent displacement or longitudinal movement thereof.

In order to prevent rotation of the bolt 27 during the screwing up of nut 29 thereon, I prefer to provide the side or leg of the inverted U-shape portion 11 having slot 17 and aperture 18 with a lip or enlargement as at 30 at a suitable distance removed from the bolt-receiving hole 18 in the side or leg, in order to provide an abutment for one of the flat faces of the head 28 of the bolt 27. With this arrangement, it is obvious that a single wrench need be employed for screwing up the nut 29, as rotation of the bolt is impossible in view of the lug or enlargement 30 contacting with one of the flat faces of the head of the bolt.

The exemplification shown in the drawing is believed to be its simplest embodiment, but modifications may be made without, however, departing from the spirit of my invention.

What I claim is:—

Pipe anchoring means comprising a wide U-shape member adapted to receive a pipe, one end of the member having an apertured flange extending upwardly from the closed side of the member, one side of the U-shape member having a transverse slot socketed intermediate of its ends, while the other side of the member is provided with a transverse slot aligned with the slot in the first mentioned side and with a bolt receiving opening aligned with the socketed portion of the slot in the first mentioned side, a wide wedge member having a flat upper face and a depending apertured lobe at the large end thereof, the lower tapered side of the wedge member adjacent the large end thereof being channeled in alignment with the aperture in said lobe, and a clamping bolt adapted to pass through the apertured lobe, said channel, through the socketed portion of the first mentioned slot and through the bolt receiving opening of the second mentioned side of said U-shape member whereby fastening of the bolt will induce a drawing action on the wedge member in proximity to its longitudinal axis transversely of the U-shape member and force the flat face of the wedge member into firm relation with the pipe.

VICTOR H. HARBERT.